United States Patent
Green

(10) Patent No.: US 6,848,732 B2
(45) Date of Patent: Feb. 1, 2005

(54) SECURE STORAGE CHAMBERS

(76) Inventor: Stanley Green, 8 Rashleigh Way, Horton Kirby, Dartford, Kent (GB), DA4 9DJ ( * ) Notice: Subject to any disclaimer, the term of this patent is extended or adjusted under 35 U.S.C. 154(b) by 0 days.

(21) Appl. No.: 10/699,755

(22) Filed: Nov. 3, 2003

(65) Prior Publication Data

US 2004/0108344 A1 Jun. 10, 2004

Related U.S. Application Data

(63) Continuation of application No. PCT/GB02/01475, filed on Mar. 28, 2002.

(30) Foreign Application Priority Data

May 15, 2001 (GB) .............................. 0111820

(51) Int. Cl.[7] .............................................. B60R 7/02
(52) U.S. Cl. .................. 296/24.33; 296/37.5; 296/37.6; 224/498; 224/499
(58) Field of Search .............................. 296/24.3, 24.33, 296/24.43, 24.44, 37.1, 37.5, 37.6, 37.8; 224/486, 497, 498, 499

(56) References Cited

U.S. PATENT DOCUMENTS

| | | | |
|---|---|---|---|
| 5,121,959 A | * 6/1992 | King .......................... 296/37.6 |
| 6,015,071 A | 1/2000 | Adomeit et al. | |
| 6,454,148 B1 | * 9/2002 | Cook .......................... 224/404 |
| 6,499,434 B1 | * 12/2002 | Tyler .......................... 119/453 |
| 2002/0175530 A1 | * 11/2002 | Lake .......................... 296/37.6 |
| 2003/0141731 A1 | * 7/2003 | Betts et al. ................ 296/24.1 |
| 2003/0209919 A1 | * 11/2003 | Gehring et al. ............. 296/37.5 |
| 2004/0041424 A1 | * 3/2004 | Caro et al. ................. 296/37.5 |
| 2004/0056058 A1 | * 3/2004 | Ryan .......................... 224/498 |

FOREIGN PATENT DOCUMENTS

| | | |
|---|---|---|
| DE | 4340675 | 6/1995 |
| GB | 2194760 | 3/1988 |

* cited by examiner

Primary Examiner—Patricia L. Engle
(74) Attorney, Agent, or Firm—Gauthier & Connors LLP

(57) ABSTRACT

A van is provided within its carrying compartment with an installation for use in the safe storage against theft of tradesmen's tools, such, for example, as electric drills. The installation comprises a substantially L-shaped frame, and several panels hingedly connected to the frame for movement between a collapsed, non obtrusive state in which chamber front and side panels are prostrate on, or adjacent to the compartment floor, and an erect state in which these are able to cooperated with a lid panel also hinged to the frame to create the chamber.

6 Claims, 5 Drawing Sheets

SECURE STORAGE CHAMBERS

This application is a continuation of PCT/GB02/01475 filed Mar. 28, 2002.

BACKGROUND OF THE INVENTION

Field of the Invention

The invention relates to secure storage chambers for fixed installation within a compartment of a mobile vehicle, to kits of parts from which such storage chambers may be assembled, and to mobile vehicles having a vehicle compartment within which such a storage chamber shall have been installed.

The theft of valuable work tools, both mechanical and electro-mechanical, as well as other valuable items of substantial size, from mobile vehicles, notably motor vans, is commonplace, and it is the purpose of the present invention to offer a design for a secure storage chamber, being a chamber of a construction eminently well suited for installation, primarily, within a commodity carrying compartment of a van or other road vehicle.

SUMMARY OF THE INVENTION

Mobile vehicles, and kits of parts as aforesaid, are as set forth in the claiming clauses, or any of them, accompanying this Application and, accordingly, the content of said claiming clauses and the inter-relationships therebetween are to be regarded, notionally, as being here set forth, also.

A tradesman's van and, more specifically, a kit of parts adapted for assembly such as to constitute a fixed secure storage chamber installation within the carrying compartment thereof, are hereinafter described with reference to the accompanying drawings.

DESCRIPTION OF THE INVENTION

Figure 7:
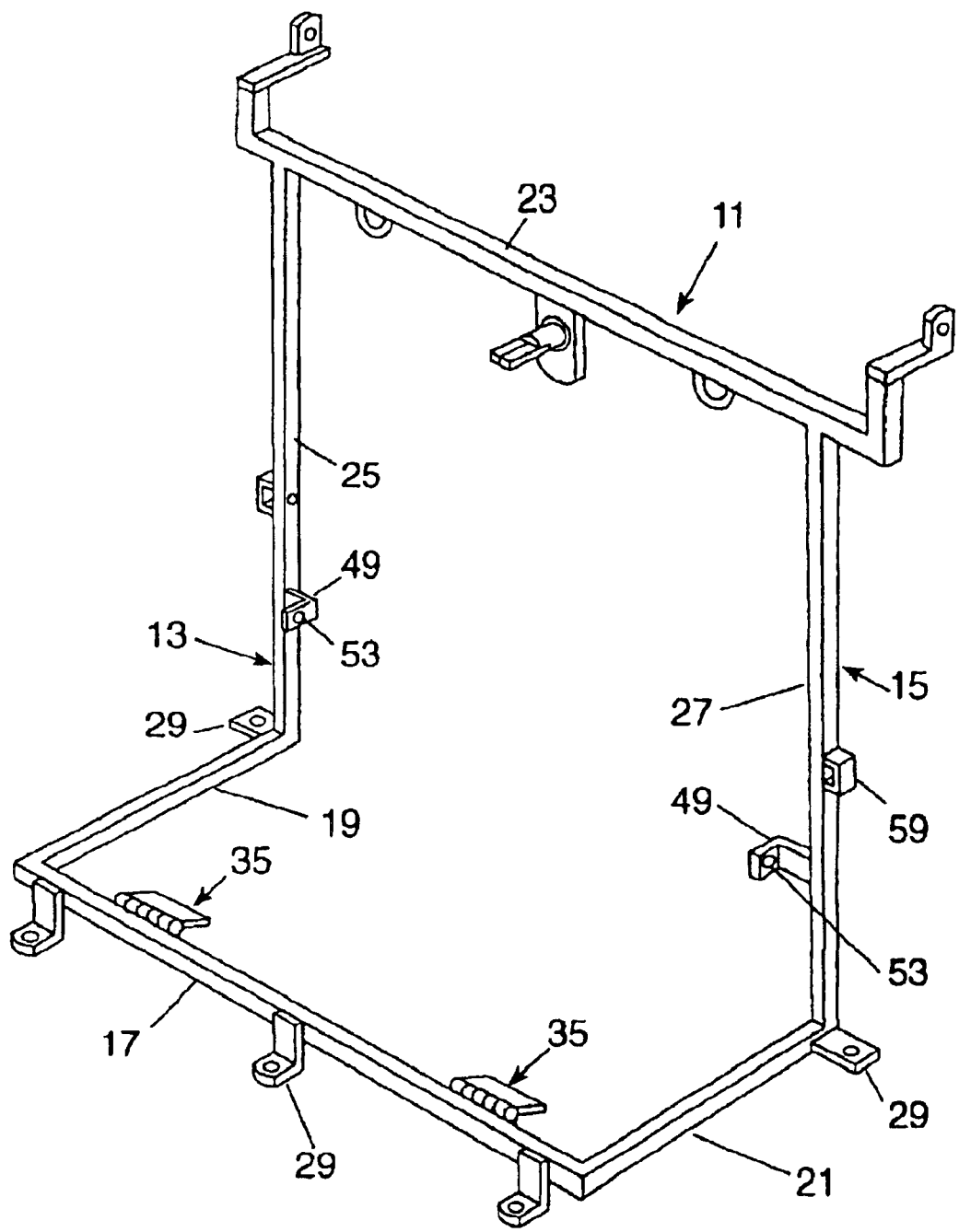

The installation has a panel supporting frame (FIG. 7) which comprises: a frame part 11 having first and second rigid, substantially L-shaped, square cross-section, mild steel, tubular side members 13, 15, suitably of 2.5 mm wall thickness, said side members being respectively contained in spaced parallel planes; a frame first cross-member 17 which bridges corresponding first limb portions 19, 21, respectively, of the L-shaped side members 13, 15 at the forward ends thereof; and, a frame second cross-member 23 which bridges corresponding second limb portions 25, 27 or the L-shaped frame side members 13, 15 at the upper ends thereof.

Figure 1:
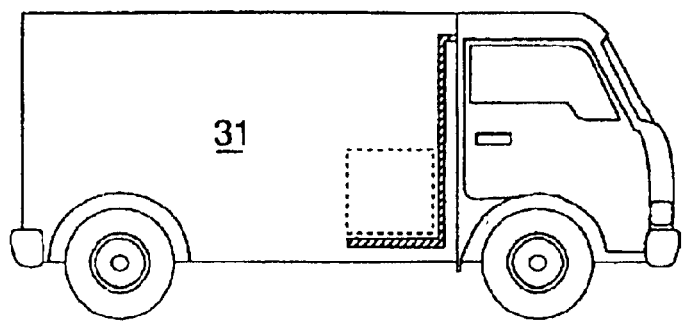
FIG. 1 shows a side view of a motor van within which is installed a diagrammatically represented safe storage chamber structure.

The first limb portions 19, 21, and the first cross-member 17 of the frame, ate provided with a multiplicity of lugs 29 having passages adapted to receive bolt connectors (not shown) by means of which the installation, of which the frame 11 is part, is to be secured to the floor (not illustrated) of the vehicle compartment 31 (FIG. 1). When so secured, the first limb portions 19, 21, of the frame side members, and frame first cross-member 17 are contained in a horizontal plane, and the second limb portions 25, 27, of said frame side members, and the frame second cross-member 23 are contained in a vertical plane.

Attached to the frame 11, there are, in the example, four panel members. Each of the aforesaid panel members comprises a body of flat sheet mild-steel, suitably of 2.5 mm gauge, and an endless mild-steel tubular sub-frame of square cross-section identical to that of the side frame members 13, 15, each sub-frame being of a size and shape such as to extend round the periphery of the body of sheet material, the sub-frame and the body being secured together by tack welds at intervals around the sub-frame.

Figure 3:
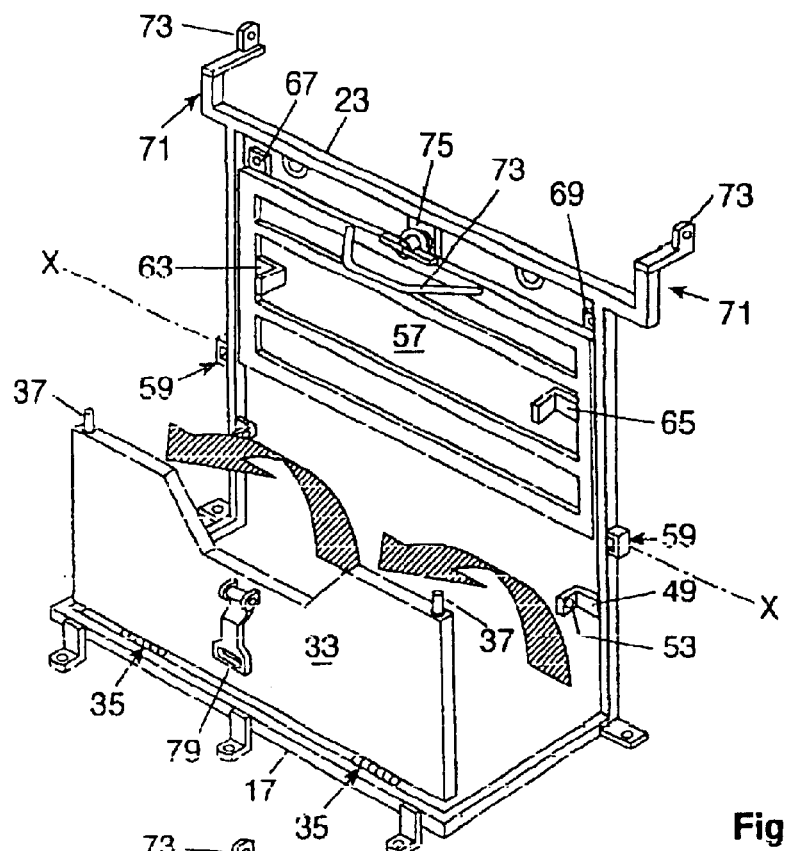
FIGS. 3 to 5 show, pictorially, the first, second and third steps in the erection of the safe storage chamber from the compact configuration of FIG. 2, FIG. 5 being shown with part of the lid panel cut-away.
Figure 4:
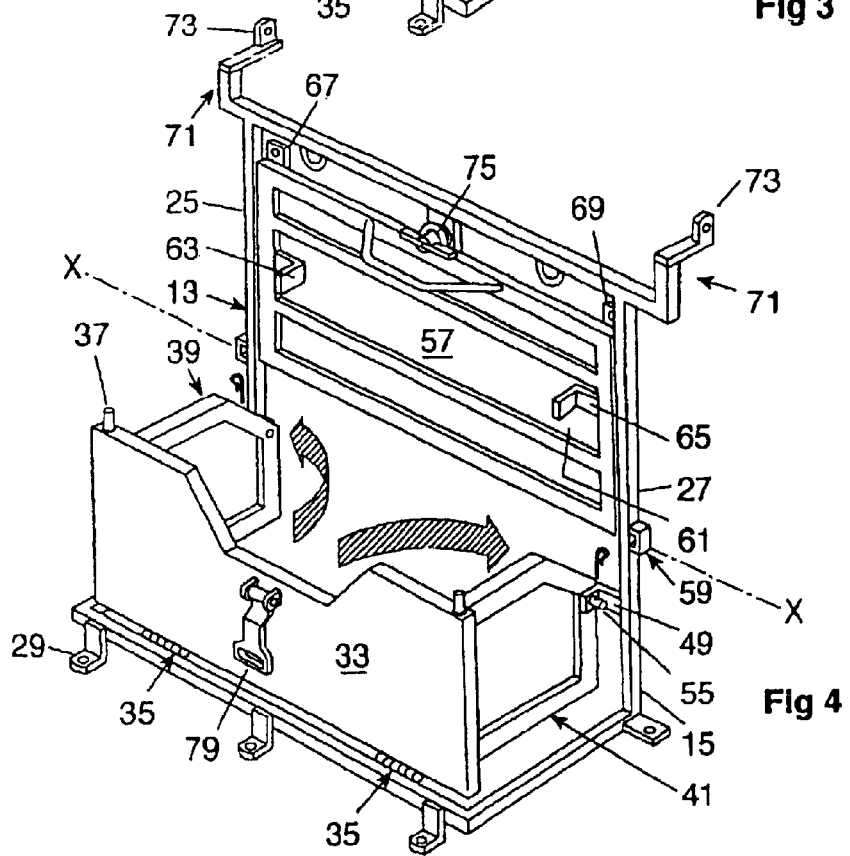

One of the four panel members is a front panel member 33 the bottom member of whose box-section sub-frame is connected by spaced apart hinges 35 to the frame box-section first cross-member 17, the hinges being such as to constrain the front panel member 33 for angular displacement between a first, or collapsed, position (FIG. 2) at which the front panel member lies flat parallel with the compartment floor, and a second, or erect, position (FIGS. 3, 4, and 5), at which the panel member 33 extends, transversely of the vehicle, upright with respect to the compartment floor. The sub-frame of the front panel member has, at its extremities, upstanding posts, as 37.

First and second side panel members 39, 41, have their sub-frames respectively connected, at hinges, as 43, to the sub-frame of the front panel member 33 adjacent to the side edges 45, 47, thereof.

It will be observed (FIG. 2), with the front panel member 33 in the collapsed state, the side panel members 39, 41, are such as each to lie with one major surface thereof in face to face contact with the compartment floor, and with the other in supporting face to face contact with the front panel member 33.

Figure 2:
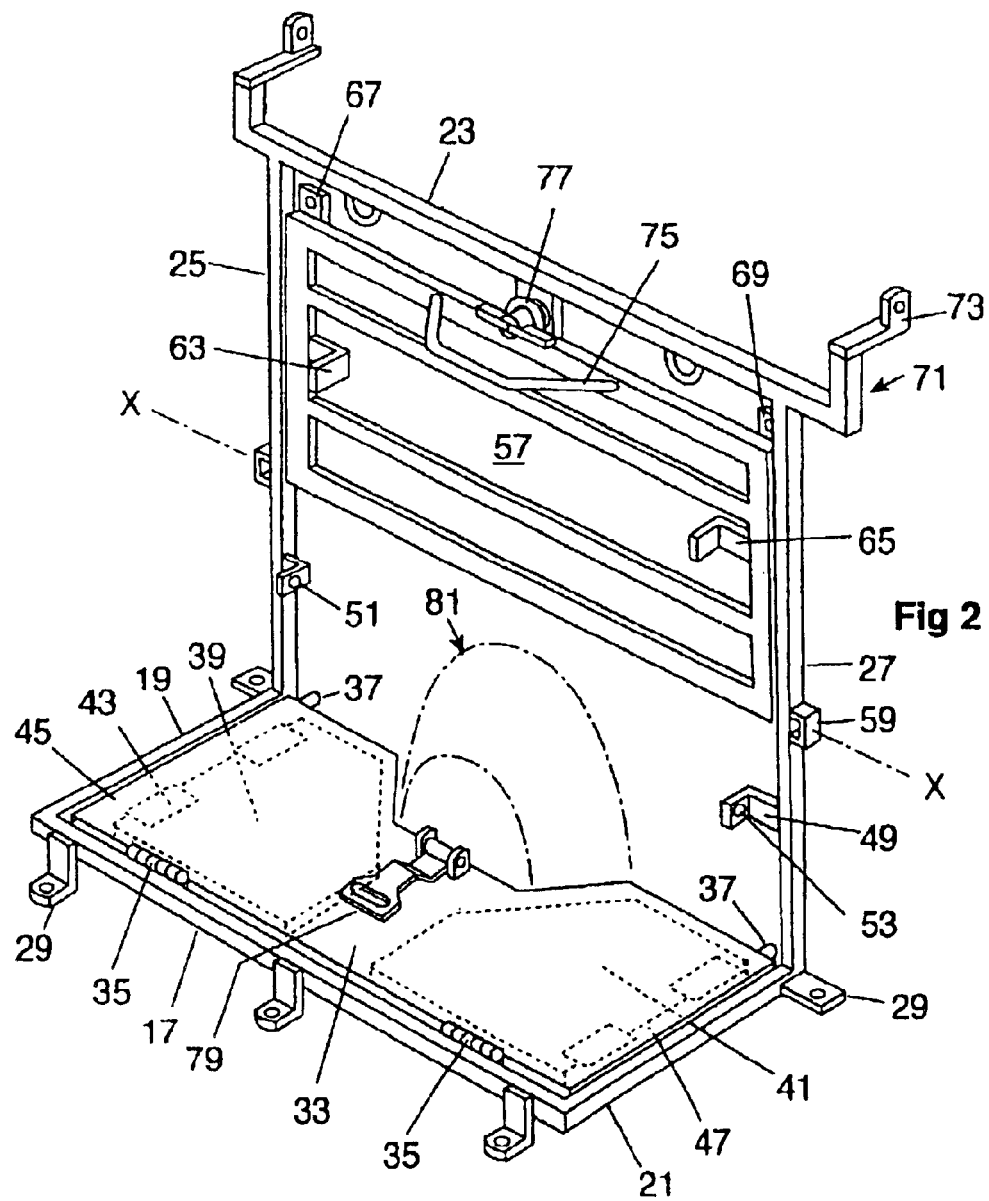
FIG. 2 shows, pictorially, the structure represented in FIG 1, safe storage chamber wall panels being disjointed and folded to an unobtrusive compact configuration.

Projecting from corresponding major surfaces of the side panels 39, 41, there are two posts (not shown) each provided with a diametral hole towards the free and thereof, and the front panel 33 has two passages, as 33', at spaced locations such that with the front and side panel members in the collapsed position shown in FIG. 2, the aforesaid posts are respectively received within said passages 33', the free ends of the posts projecting proud of the front surface of the front panel 33. Elongate wire clips (not shown) extend through the passages, the side and front panel members being thereby held for movement as one.

In swinging the front panel member 33 upwardly from the collapsed to the erect position, the aide panel members 39, 41, are compelled to follow. The second limb portions 25, 27, of the frame side members 13, 15, have inwardly extending transversely aligned lugs 49, 51, respectively, through which correspondingly located passages, as 53, extend, and the sub-frames of the side panel members 39, 41, carry posts, as 55, the positions of which are such as, when the front panel member 33 is in the upright position, to be able, respectively, to enter the passages 53, the second limb portions 27, 29, of the frame side members 13, 15, thereby serving in the provision of rigid support for the hingedly connected front 33 and side panel members 39, 41.

The fourth panel member is constituted by the lid 57. The lid 57 spans the space between the vertical, second limb portions 25, 27, of the frame side members 13, 15, being supported therebetween for angular displacement about a transverse axis X - - - X defined by transversely aligned first and second pivotal bearing arrangements, as 59.

Figure 5:
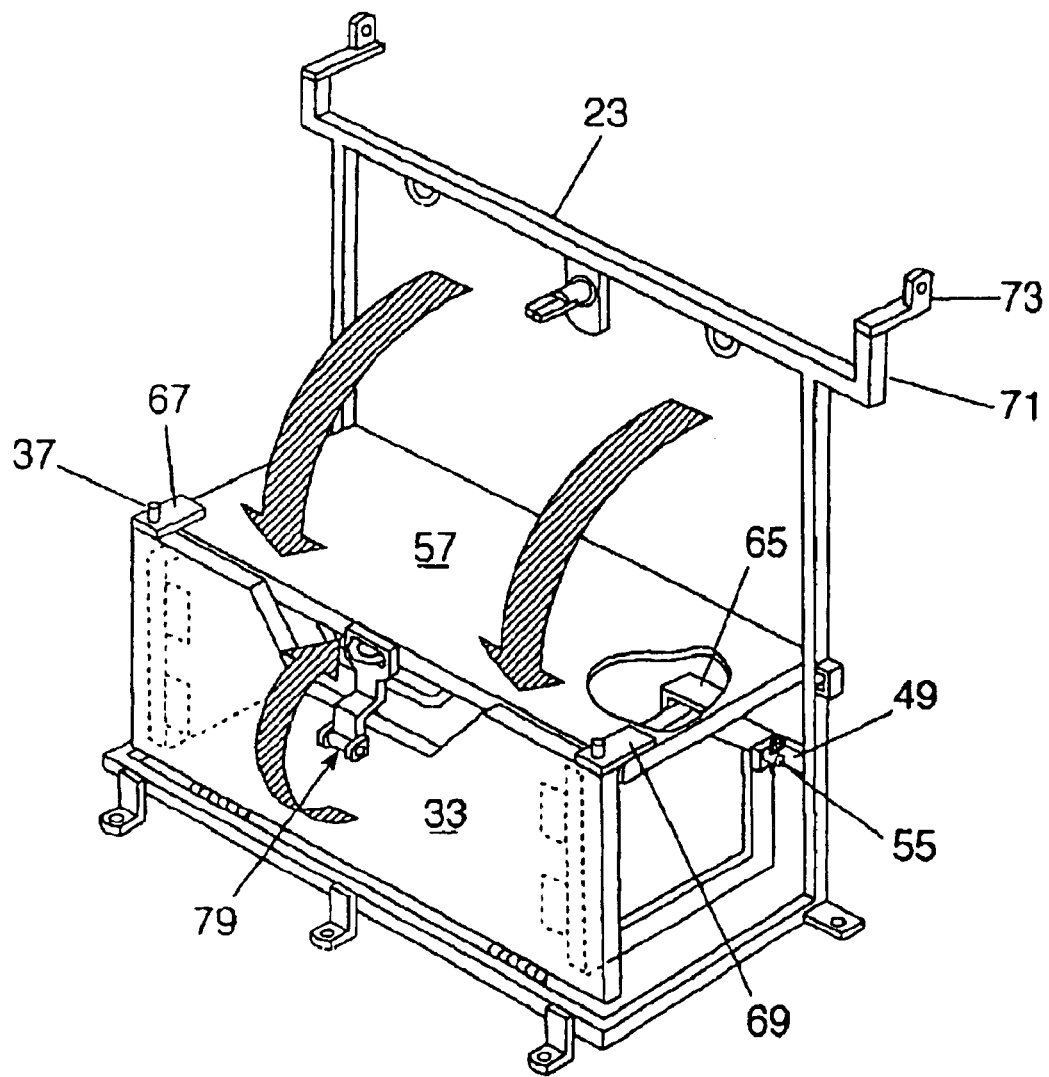
Figure 6:
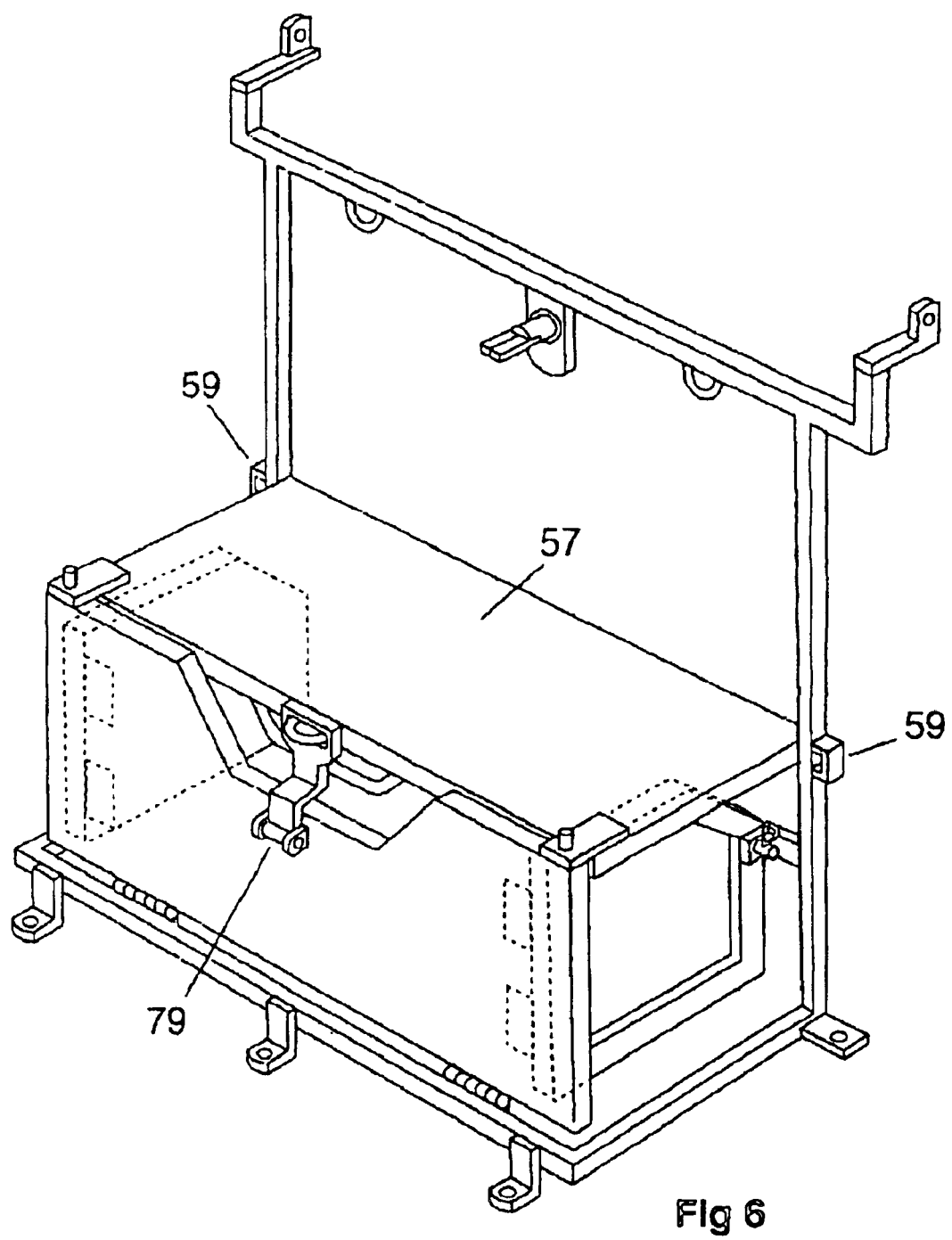
FIG. 6 shows the structure with the safe storage chamber in the fully erect configuration; and, FIG. 7 shows the panel supporting frame of the installation.

The lid 57 is angularly displaceable about the axis X - - - X between the vertical plane (FIGS. 2 to 5) and the horizontal plane (FIG. 6). Projecting outwardly from the underside 61 of the lid 57 at or adjacent to the side edges thereof, there are first and second lugs 63, 65, respectively, and, projecting from the outer extremities of the upper edge of the lid panel 57, there are apertured lugs 67, 69, respectively.

At the ends of the second cross-member 23, bridging the frame side members 13, 15, there are elbow extension portions, as 71, from which project apertured lugs, as 73, these providing locations at which the second limb portions 25, 27, of the side members 13, 15, of the frame 11 may be secured, at the top, to side walls or other convenient structural parts of the vehicle compartment. Other features which should be mentioned are the lid handle 75, latch means 77 for releasibly holding the lid 57 in the vertical plane, and a strong pad-locking means 79 which is for releasibly coupling the lid 57 and the front panel member 33 and which, in addition, serves as a handle for raising the front and side panel members as one from the collapsed position of FIG. 2.

It should be noted, also, that the installation is, in the embodiment, devoid of a rear panel member. The lack of such a panel member arises from the circumstance that, in the example, the frame abuts a bulkhead or analogous wall separating the driver compartment from the compartment in which the frame 11 and the several said panel members are to be found. It will be noted, also, that, in the example, the front and side panel members have cut-away portions, this to accommodate the protrusion created by the rear 79 of the vehicle engine housing.

In other circumstances, of course, a rear panel member might be provided, the latter panel member comprising, in distinction from the front, side and lid panel members, a body of mid-steel sheet material secured, directly, as by tack welds (the rear panel member not being angularly displaceable a panel sub-frame would not then b required), to the forward faces of the second limb portions 25, 27, of the frame side members 13, 15. The absence of an engine housing protrusion, as 81, would, of course, avoid the need for cut-aways in the front and side panel members.

The several Figures clearly show the conversion of the structure from a compact form (FIG. 2) to the fully erect state (FIGS. 3 to 5) at which a safe storage chamber emerges.

From the collapsed position (FIG. 2), the front 33 and side panel members 39, 41, are to be swung upwardly about the hinge axis of the front panel member. With the front panel member 33 in the vertical plane (FIG. 3), the side panel members 39, 41, may be swung outwardly about their parallel hinge axes with the front and side panel members given support by the inter-engagement between the posts 55 and lugs 49.

With the front and side panel members thus supported, the lid panel member 57 is, after being freed from the frame 11, by release of the latch means 77, for angular movement about its pivot axis X - - - X, brought to contact with the upper rims of the front 33 and side panel members 39, 41, thereby to serve as the upper closure member of the chamber so formed with the posts 37 received within the apertures of the lid panel lugs 67, 69.

As indicated within the cut-away of FIG. 5, in the course of bringing the lid panel 57 to the closure position, the lugs 63, 65, projecting from its underside, are brought to positions respectively lying in the paths of angular displacement of the side panel members 39, 41. With the chamber closed, and with the chamber pad-locked, the presence of the lugs 63, 65, secures the chamber against easy unauthorised access to valuables which may be held within the chamber, whilst, by folding the several hinged panel members to the positions shown in FIG. 2, the front and side panel members being then flat with respect to the compartment floor, and the lid panel member being supported vertically against the frame 11, the installation is unobtrusive and does not constitute an obstruction in the use of the compartment for work purposes.

It is to be observed that the elbow extension portions 69, 71, project upwardly from the cross-member 23, the frame 11 being thereby provided with a step formation, which may be used to receive one end of lengthy items, such, for example, as a ladder to be transported.

Although not illustrated, the compartment may be provided with a second frame located at the opposite end of the compartment from the frame 11 of the aforedescribed installation. The additional frame would be hinged at its lower end to be displaceable between an erect lockable position and a position at which it is in contact with the compartment floor. The additional frame, when erect, would then serve to support the ladder or other lengthy item at its rear end.

What is claimed is:

1. A mobile vehicle having a compartment within which is an installation which comprises:
    (a) a frame part having:
        (i) first and second rigid, substantially L-shaped, frame side members respectively contained in laterally spaced parallel planes;
        (ii) a frame first cross-member which bridges first corresponding limb portions, of said side members
        (iii) a frame second cross-member which bridges second corresponding limb portions of said side members;
    (b) means for securing said frame rigidly with respect to the vehicle body;
    (c) a front wall panel member hingedly connected to said frame first cross-member;
    (d) first and second side wall panel members respectively hingedly connected to said front wall panel member substantially at the edges thereof;
    (e) a lid panel member hingedly connected to said second limb portions of said frame side wall members; and in which,
    (f) parts (a)–(e) are constructed, arranged and adapted such that the front and side wall panel members are respectively pivotal between a first configuration in which said front and side wall panel members are in a compact relationship and a second configuration in which they are fully erect;
    (g) said lid panel member is pivotal about the hinge axis defined by its hinge connections with said second limb portions of said frame side members so as, with said front wall panel and side wall panel members in the erect configuration, to effect closure of an uncapped volume defined by said upstanding front and side wall panel members, thereby to constitute a security chamber; and,
    (h) said lid panel member incorporates means operative, with said lid panel member serving as the closure member for said uncapped volume, to lock the side wall panel members against movement about their hinge connections with the front wall panel member.

2. A vehicle as claimed in claim 1 in which: said members of said frame part are each of tubular form;

said panel members each comprise a metal panel part and, extending around a marginal zone of each said panel part, an endless sub-frame composed of tubular members to which the relevant metal panel part is substantially irremovably united, and, said hinge connections are constituted as connections between said tubular members.

3. A vehicle as claimed in claim 2 in which said tubular members are of rectangular cross-section.

4. A vehicle as claimed in claim 2 in which: said configuration installation is such that in said first configuration, said front and side panel members of the structure are contained in planes parallel to the vehicle compartment floor.

5. A vehicle as claimed in claim 2 in which:

the hinge connection between said lid panel member and said second limb portions of said frame side members are at locations intermediate the ends of said second limb portions, and said frame second cross-member is located at or in close proximity to free ends of said second limb portions, and is integral therewith.

6. A kit of parts adapted and constructed so as to enable said parts to be assembled so as to constitute an installation in a vehicle, being an installation as specified in claim 1.

* * * * *